(12) United States Patent
Chen et al.

(10) Patent No.: US 8,923,643 B2
(45) Date of Patent: Dec. 30, 2014

(54) IMAGE PROCESSING CIRCUIT AND IMAGE PROCESSING METHOD

(75) Inventors: Yen-Sung Chen, New Taipei (TW); Tsui-Chin Chen, Hsinchu (TW); Yu-Tsung Hu, Changhua County (TW); Xing-Rui Wang, Shanghai (CN)

(73) Assignee: Novatek Microelectronics Corp., Hsinchu (TW)

( * ) Notice: Subject to any disclaimer, the term of this patent is extended or adjusted under 35 U.S.C. 154(b) by 247 days.

(21) Appl. No.: 13/563,466

(22) Filed: Jul. 31, 2012

(65) Prior Publication Data

US 2013/0034310 A1   Feb. 7, 2013

(30) Foreign Application Priority Data

Aug. 1, 2011   (TW) .............................. 100127285 A

(51) Int. Cl.
*G06K 9/40* (2006.01)
*H04N 5/228* (2006.01)
*H04N 19/43* (2014.01)
*H04N 19/51* (2014.01)

(52) U.S. Cl.
CPC ... *H04N 19/00509* (2013.01); *H04N 19/00587* (2013.01)
USPC ....................................... 382/254; 348/208.4

(58) Field of Classification Search
CPC ................. H04N 19/00587; H04N 19/00278; H04N 19/00789; G06T 7/206
USPC ................. 382/107, 173, 254, 300, 312; 348/240.16, 240.18, 208.4; 375/240.16, 240.18
See application file for complete search history.

(56) References Cited

U.S. PATENT DOCUMENTS

| 8,144,782 B2 * | 3/2012 | Lee et al. ................. 375/240.16 |
| 8,218,635 B2 * | 7/2012 | Topham .................. 375/240.16 |
| 8,345,763 B2 * | 1/2013 | Chen et al. ............... 375/240.16 |
| 8,422,742 B2 * | 4/2013 | Tsai et al. ..................... 382/107 |
| 8,660,182 B2 * | 2/2014 | Zhong et al. ............. 375/240.16 |

FOREIGN PATENT DOCUMENTS

CN   101309407 A   11/2008

OTHER PUBLICATIONS

Chinese Office Action dated on Oct. 10, 2014.

* cited by examiner

*Primary Examiner* — Kanjibhai Patel
(74) *Attorney, Agent, or Firm* — Rabin & Berdo, P.C.

(57) ABSTRACT

An image processing circuit and an image processing method are disclosed. The image processing circuit comprises a block matching unit, a multiplexer, an arbiter, and a motion compensation circuit. The block matching unit calculates an alternating current (AC) sum of absolute difference (SAD) and a direct current (DC) sum of absolute difference (SAD) according to a current block in a current image and a reference block in a reference image. The arbiter controls the multiplexer selectively to output the AC SAD or the DC SAD according to an arbitration rule related to a scene characteristic of the current image. The motion compensation circuit executes motion compensation according to the AC SAD or the DC SAD outputted by the multiplexer.

16 Claims, 3 Drawing Sheets

IMAGE PROCESSING CIRCUIT AND IMAGE PROCESSING METHOD

This application claims the benefit of Taiwan application Serial No. 100127285, filed Aug. 1, 2011, the subject matter of which is incorporated herein by reference.

BACKGROUND OF THE INVENTION

1. Field of the Invention

The invention relates in general to an image processing circuit and an image processing method, and more particularly to an image processing circuit and an image processing method capable of executing motion compensation according to an alternating current (AC) sum of absolute difference (SAD) or a direct current (DC) sum of absolute difference (SAD).

2. Description of the Related Art

Referring to FIG. 1, a motion estimation and compensation device is shown. The motion estimate and motion compensation (MEMC) device 1 comprises a motion estimation engine 11 and a motion compensation circuit 12. The motion estimation engine 11 executes motion estimation according to a current image and a reference image, so that the motion compensation circuit compensates an image by way of interpolation according to the result of motion estimation.

The motion estimation engine 11 comprises a block matching unit 111. The block matching unit 111 divides the current image into a plurality of blocks of equal size. Each block has a corresponding search region in the reference image. The block matching unit 111 calculates a direct current (DC) sum of absolute difference (SAD) of a current block and a reference block so as to locate the block most similar to the current block in the search region.

Referring to FIG. 1, FIG. 2, FIG. 3 and FIG. 4. FIG. 2 shows a reference image. FIG. 3 shows a current image. FIG. 4 shows an image with interpolation. However, when the display image flashes, the block matching unit 111 will be unable to locate the block most similar to the current block according to the DC SAD. For example, the local region 21 of FIG. 2 and the local region 31 of FIG. 3 are such as a vehicle lamp. The local region 21 is full dark, and the local region 31 is full bright. Since the difference between the pixels in the local region 31 and the pixels in the local region 21 is too large, the block matching unit 111 cannot locate the block most similar to the current block according to the DC SAD. Consequently, the motion compensation circuit 12 will produce an image compensated with interpolation as illustrated in FIG. 4 due to incorrect matching of blocks. The local region 41 corresponds to the local region 31 and the local region 21. The local region 41 may be deformed if the matching of blocks is incorrect.

SUMMARY OF THE INVENTION

The invention is directed to an image processing circuit and an image processing method capable of locating a block most similar to a current block according to whether local region flashes or is a motion object so as to correctly execute motion compensation.

According to an embodiment of the present invention, an image processing circuit is disclosed. The image processing circuit comprises a block matching unit, a multiplexer, an arbiter, and a motion compensation circuit. The block matching unit calculates an alternating current (AC) sum of absolute difference (SAD) and a direct current (DC) sum of absolute difference (SAD) according to a current block in a current image and a reference block in a reference image. The arbiter controls the multiplexer selectively to output the AC SAD or the DC SAD according to an arbitration rule related to a scene characteristic of the current image. The motion compensation circuit executes motion compensation according to the AC SAD or the DC SAD outputted by the multiplexer.

According to another embodiment of the present invention, an image processing method is disclosed. The image processing method comprises the following steps: An AC SAD and a DC SAD are calculated according to a current block in a current image and a reference block in a reference image. The AC SAD or the DC SAD is selectively outputted according to an arbitration rule related to a scene characteristic of the current image. A motion compensation process is executed according to the AC SAD or the DC SAD.

The above and other aspects of the invention will become better understood with regard to the following detailed description of the preferred but non-limiting embodiment (s). The following description is made with reference to the accompanying drawings.

DETAILED DESCRIPTION OF THE INVENTION

First Embodiment

Figure 1:
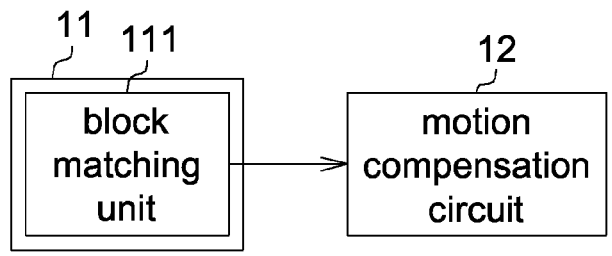
FIG. 1 shows a motion estimation and compensation device.
Figure 2:
FIG. 2 shows a reference image.
Figure 3:
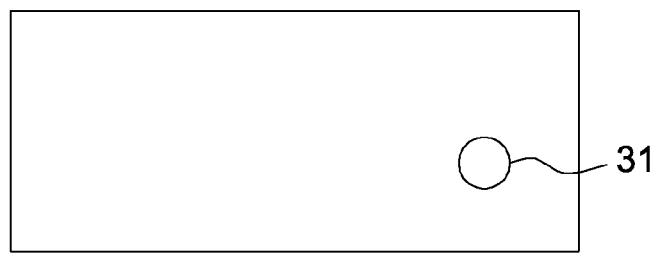
FIG. 3 shows a current image.
Figure 4:
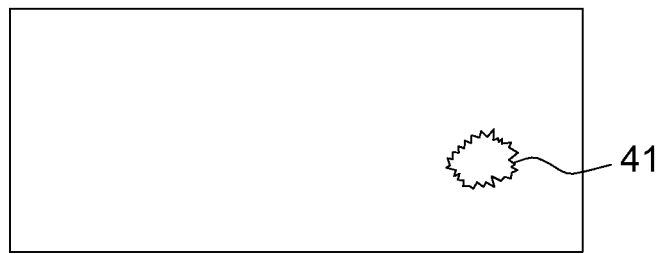
FIG. 4 shows an image with interpolation.
Figure 5:
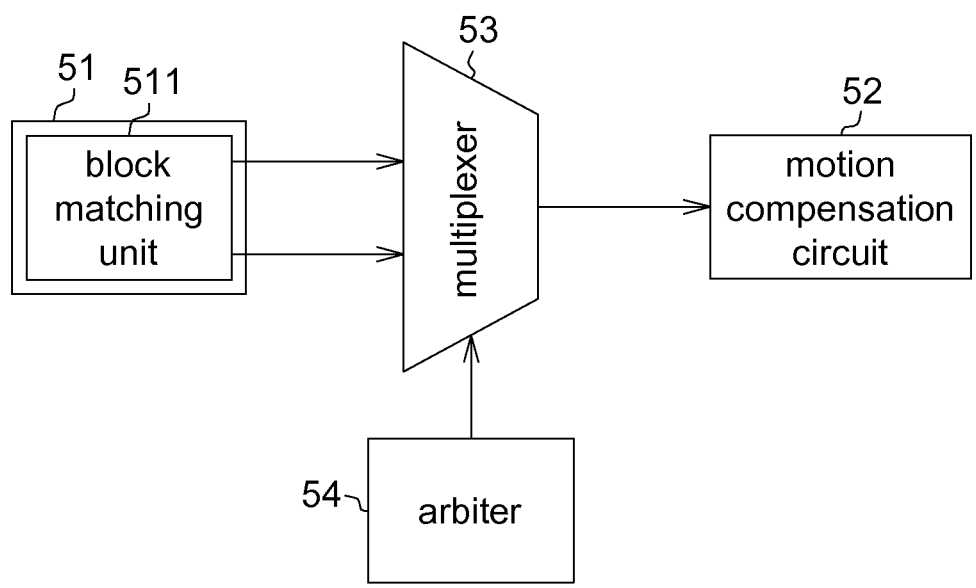
FIG. 5 shows an image processing circuit according to a first embodiment.
Figure 6:
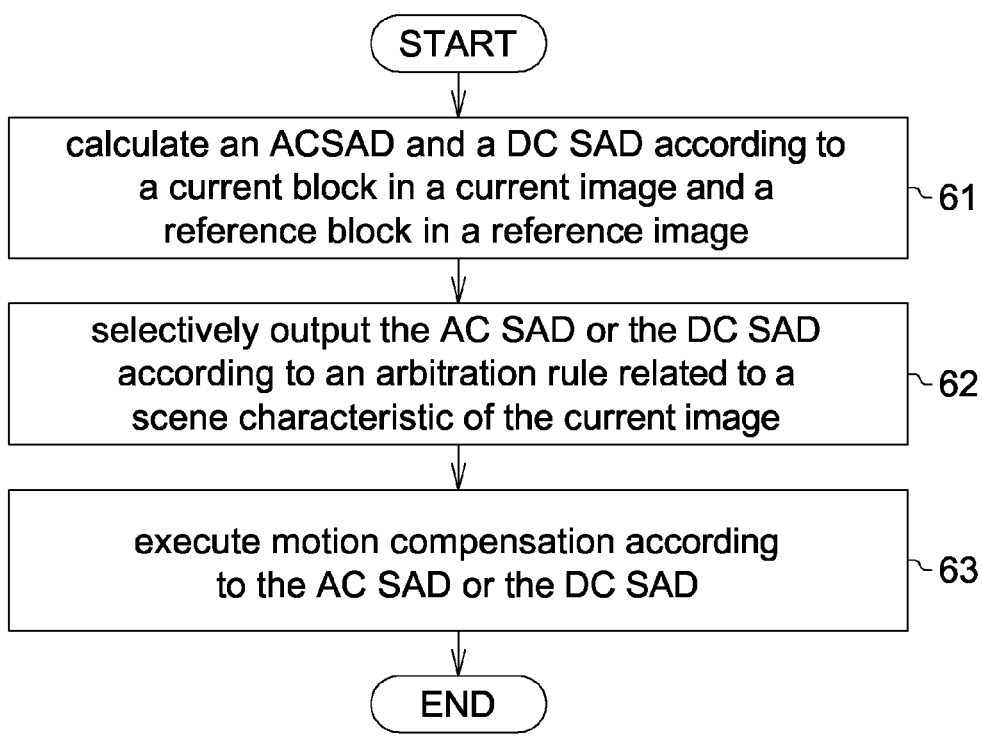
FIG. 6 shows a flowchart of an image processing method according to a first embodiment.

Referring to FIG. 5 and FIG. 6. FIG. 5 shows an image processing circuit according to a first embodiment. FIG. 6 shows a flowchart of an image processing method according to a first embodiment. The image processing circuit 5 comprises a motion estimation engine 51, a motion compensation circuit 52, a multiplexer 53 and an arbiter 54. The motion estimation engine 51 further comprises a block matching unit 511. The image processing method, applicable to the image processing circuit 5, comprises the following steps:

Firstly, the method begins at step 61, the block matching unit 511 outputs an alternating current (AC) sum of absolute difference (SAD) AC_SAD and a direct current (DC) sum of absolute difference (SAD) DC_SAD according to a current block in a current image and a reference block in a reference image. The block matching unit 511 calculates the DC SAD DC_SAD according to the pixel value of the current block $f_{i,j}^{t}$ and the pixel value of the reference block $f_{i+x,j+y}^{t-1}$. The DC SAD is expressed as:

$$DC\_SAD = \sum_{i=0}^{N-1}\sum_{j=0}^{N-1} |f_{i,j}^{t} - f_{i+x,j+y}^{t-1}|.$$

(x,y) denotes the displacement of the current block and the reference block. Each block has N×N pixels.

The AC SAD may be calculated according to two different ways. According to the first calculation method, the AC SAD AC_SAD is calculated by the block matching unit 511 according to a DC SAD DC_SAD and a DC difference $DC_{diff}$, wherein AC SAD is expressed as: $AC_{13}SAD=|DChd$ —SAD−DC $_{diff}$|. According to the second calculation method, the AC SAD AC_SAD is calculated by the block matching unit 511 according to the pixel value of the current block $f_{i,j,t}$, the average pixel value of the current block $DC_{avg1}$, the pixel value of the reference block $f_{i+x,j+y}^{t-1}$ and the average pixel value of the reference block $DC_{avg\,2}$, wherein the AC SAD is expressed as:

$$AC\_SAD = \sum_{i=0}^{N-1}\sum_{j=0}^{N-1} ||f_{i,j}^t - DC_{avg1}| - |f_{i+x,j+y}^{t-1} - DC_{avg2}||$$

Next, the method proceeds to step 62, the arbiter 54 controls the multiplexer 53 selectively to output the AC SAD AC_SAD or the DC SAD DC_SAD according to an arbitration rule related to a scene characteristic of the current image, arbitration rule. Then, the method proceeds to step 63, the motion compensation circuit 52 executes motion compensation according to the AC SAD AC_SAD or the DC SAD DC_SAD outputted by the multiplexer 53.

When the local region flashes, the motion compensation circuit 52 correctly executes motion compensation according to the AC SAD AC_SAD. Conversely, when the local region is a motion object, the motion compensation circuit 52 correctly executes motion compensation according to the DC SAD DC_SAD. Thus, no matter the local region flashes or is a motion object, the image processing circuit 5 correctly executes motion compensation.

The disclosed current image further comprises a plurality of adjacent blocks adjacent to the current block. The disclosed arbitration rules such as comprise an adjacent-block arbitration rule stating: if the multiplexer 53 correspondingly outputs the AC SAD AC_SAD with respect to the adjacent blocks, then the multiplexer 53 correspondingly outputs the AC SAD AC_SAD with respect to the current block, and if the multiplexer 53 correspondingly outputs the DC SAD DC_SAD with respect to the adjacent blocks, then the multiplexer 53 correspondingly outputs the DC SAD DC_SAD with respect to the current block.

Second Embodiment

The second embodiment is different from the first embodiment mainly in that the arbitration rules of the second embodiment comprise a difference arbitration rule. The difference arbitration rule states: if the difference between the AC SAD AC_SAD and the DC SAD DC_SAD is greater than a difference threshold, then the multiplexer 53 correspondingly outputs the AC SAD AC_SAD with respect to the current block. This is because when the local region flashes, the AC SAD AC_SAD is tiny but the DC SAD DC_SAD is huge, so the motion compensation circuit 52 may correctly execute motion compensation according to the AC SAD AC_SAD.

Conversely, if the difference between the AC SAD AC_SAD and the DC SAD DC_SAD is not greater than difference threshold, then the multiplexer 53 correspondingly outputs the DC SAD DC_SAD with respect to the current block.

This is because when the local region is a motion object, AC SAD AC_SAD is tiny and the DC SAD DC_SAD is also tine, so the motion compensation circuit 52 may correctly execute motion compensation according to the DC SAD DC_SAD.

Third Embodiment

The third embodiment is different from the first embodiment mainly in that the arbitration rules of the third embodiment further comprises a difference arbitration rule. The arbiter 51 controls the multiplexer 53 selectively to output the AC SAD AC_SAD or the DC SAD DC_SAD according to the adjacent-block arbitration rule, the adjacent blocks weight, the difference arbitration rule and the difference weight. In other words, the arbiter 51 controls the multiplexer 53 selectively to output the AC SAD AC_SAD or the DC SAD DC_SAD according to a combination of several arbitration rules for enabling the motion compensation circuit 52 to correctly execute motion compensation.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing circuit, comprising:
   a block matching unit used for calculating an alternating current (AC) sum of absolute difference (SAD) and a direct current (DC) sum of absolute difference (SAD) according to a current block in a current image and a reference block in a reference image;
   a multiplexer;
   an arbiter used for controlling the multiplexer selectively to output the AC SAD or the DC SAD according to an arbitration rule related to a scene characteristic of the current image; and
   a motion compensation circuit used for executing motion compensation according to the AC SAD or the DC SAD outputted by the multiplexer.

2. The image processing circuit according to claim 1, wherein the current image further comprises a plurality of adjacent blocks adjacent to the current block, the arbitration rule comprises an adjacent-block arbitration rule stating: if the multiplexer correspondingly outputs the AC SAD with respect to the adjacent blocks, then the multiplexer correspondingly outputs the AC SAD with respect to the current block, and if the multiplexer correspondingly outputs the DC SAD with respect to the adjacent blocks, then the multiplexer correspondingly outputs the DC SAD with respect to the current block.

3. The image processing circuit according to claim 2, wherein the arbitration rule further comprises a difference arbitration rule stating: if the difference between the AC SAD and the DC SAD is greater than the difference threshold, then the multiplexer correspondingly outputs the AC SAD with respect to the current block, and if the difference between the AC SAD and the DC SAD is not greater than the difference threshold, then the multiplexer correspondingly outputs the DC SAD with respect to the current block.

4. The image processing circuit according to claim 3, wherein the arbiter controls the multiplexer selectively to output the AC SAD or the DC SAD according to the adjacent-block arbitration rule, an adjacent blocks weight, the difference arbitration rule and a difference weight.

5. The image processing circuit according to claim 1, wherein the arbitration rule comprises a difference arbitration rule stating: if the difference between the AC SAD and the DC SAD is greater than the difference threshold, then the multiplexer correspondingly outputs the AC SAD with respect to the current block, and if the difference between the AC SAD and the DC SAD is not greater than the difference threshold, then the multiplexer correspondingly outputs the DC SAD with respect to the current block.

6. The image processing circuit according to claim 1, wherein the block matching unit calculates the DC SAD according to the pixel value of the current block and the pixel value of the reference block.

7. The image processing circuit according to claim 1, wherein the block matching unit calculates the AC SAD according to the DC SAD and a DC difference.

8. The image processing circuit according to claim 1, wherein the block matching unit calculates the AC SAD according to the pixel value of the current block, the average pixel value of the current block, the pixel value of the reference block and the average pixel value of the reference block.

9. An image processing method, comprising:
calculating an AC sum of absolute difference (SAD) and a DC SAD according to a current block in a current image and a reference block in a reference image;
selectively outputting the AC SAD or the DC SAD according to an arbitration rule related to a scene characteristic of the current image; and
executing motion compensation according to the AC SAD or the DC SAD.

10. The image processing method according to claim 9, wherein the current image further comprises a plurality of adjacent blocks adjacent to the current block, the arbitration rule comprises an adjacent-block arbitration rule stating: if the AC SAD is correspondingly outputted with respect to the adjacent blocks, then the AC SAD is correspondingly outputted with respect to the current block, and if the DC SAD is correspondingly outputted with respect to the adjacent blocks, then the DC SAD is correspondingly outputted with respect to the current block.

11. The image processing method according to claim 10, wherein the arbitration rule further comprises a difference arbitration rule stating: if the difference between the AC SAD and the DC SAD is greater than the difference threshold, then the AC SAD is correspondingly outputted with respect to the current block, and if the difference between the AC SAD and the DC SAD is not greater than the difference threshold, then the DC SAD is correspondingly outputted with respect to the current block.

12. The image processing method according to claim 11, wherein the output step selectively outputs the AC SAD or the DC SAD according to the adjacent-block arbitration rule, an adjacent blocks weight, the difference arbitration rule and a difference weight.

13. The image processing method according to claim 9, wherein the arbitration rule comprises a difference arbitration rule stating: if the difference between the AC SAD and the DC SAD is greater than the difference threshold, then the AC SAD is correspondingly outputted with respect to the current block, and if the difference between the AC SAD and the DC SAD is not greater than the difference threshold, then the DC SAD is correspondingly outputted with respect to the current block.

14. The image processing method according to claim 9, wherein the calculation step calculates the DC SAD according to the pixel value of the current block and the pixel value of the reference block.

15. The image processing method according to claim 9, wherein the calculation step calculates the AC SAD according to the DC SAD and a DC difference.

16. The image processing method according to claim 9, wherein the calculation step calculates the AC SAD according to the pixel value of the current block, the average pixel value of the current block, the pixel value of the reference block and the average pixel value of the reference block.

* * * * *